(12) United States Patent
Gretz (10) Patent No.: US 7,214,875 B1
(45) Date of Patent: May 8, 2007

(54) LARGE VOLUME ELECTRICAL BOX WITH INTERNAL MOUNTING ARRANGEMENT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 157 days.

(21) Appl. No.: 11/287,055

(22) Filed: Nov. 25, 2005

(51) Int. Cl.
*H01H 9/02* (2006.01)

(52) U.S. Cl. .......................... 174/53; 174/50; 174/58; 174/481; 220/3.2; 220/3.3

(58) Field of Classification Search ............... 174/48, 174/49, 50, 53, 57, 58, 480, 481, 500, 503, 174/17 R, 495, 496; 220/3.2, 3.3, 3.4, 3.5, 220/3.6, 3.7, 3.8, 4.02; 439/535, 536, 537, 439/538; 248/906, 343
See application file for complete search history.

(56) References Cited

U.S. PATENT DOCUMENTS

| | | | | |
|---|---|---|---|---|
| 1,909,136 A | * | 5/1933 | Thomas, Jr. ................. | 174/50 |
| 3,386,606 A | * | 6/1968 | Pastrick ........................ | 174/50 |
| 3,690,501 A | * | 9/1972 | Ware ............................ | 174/57 |
| 4,120,473 A | | 10/1978 | Suk | |
| 4,297,525 A | | 10/1981 | Bowden, Jr. | |
| 5,378,854 A | * | 1/1995 | Hoover ........................ | 174/53 |
| 5,434,359 A | | 7/1995 | Schnell | |
| 5,596,174 A | * | 1/1997 | Sapienza ..................... | 174/57 |
| 5,600,093 A | | 2/1997 | Herth et al. | |
| 5,603,424 A | | 2/1997 | Bordwell et al. | |
| 6,229,087 B1 | * | 5/2001 | Archer ......................... | 174/50 |
| 6,756,541 B1 | * | 6/2004 | Mollick et al. .............. | 174/58 |
| 6,903,272 B2 | * | 6/2005 | Dinh ............................ | 174/58 |

* cited by examiner

*Primary Examiner*—Angel R. Estrada (57) ABSTRACT

A two-piece electrical box including a box member having a channel formed in one sidewall. An insert can be locked into the channel to form an electrical enclosure. The insert includes an internal mounting arrangement for mounting the electrical box in either new work or old work applications. The combined box member and insert with the internal mounting arrangement provides an electrical box having a significantly larger internal volume than prior art one-piece molded electrical boxes.

4 Claims, 10 Drawing Sheets

Fig. 15

LARGE VOLUME ELECTRICAL BOX WITH INTERNAL MOUNTING ARRANGEMENT

FIELD OF THE INVENTION

This invention relates to electrical boxes and specifically to a two-piece electrical box having an internal mounting arrangement for simplifying replacement of existing electrical boxes or for installation as a new work box.

BACKGROUND OF THE INVENTION

With the passage of time it is not uncommon for electrical boxes to become loose from the structures they are mounted to. Frequent attachments of plugs into an electrical outlet over time, for example, can cause the supporting outlet box to become unattached from the structure. The loosened electrical box is then a hazard, as it can cause loosening of wires within the box, electrical shorts, and potentially electrical shocks.

When an electrical box becomes loose, a prime consideration in replacing the box is minimizing damage to the surface surrounding the box. Electrical boxes for interior walls therefore must be capable of being easily installed into and secured to the existing wall without causing damage to the surrounding wall surface.

Electrical boxes have been developed specifically for the replacement of old electrical boxes, which are typically referred to as "old work" boxes. Prior art boxes of this type are described in U.S. Pat. No. 4,297,525 to Bowden, Jr., U.S. Pat. No. 4,120,473 to Suk, U.S. Pat. No. 5,603,424 to Bordwell et al., and U.S. Pat. No. 5,600,093 to Herth et al. In the above patent to Bowden, Jr., a box is shown which employs threaded mounting screws fastened into pawl arms. The pawl arms include tabs extending therefrom. After the box is inserted in an opening in a wall, tightening on the mounting screws urges the tabs linearly toward the box and eventually secures the box to the wall. Suk discloses a box that works in conjunction with a bracket to tighten against the wall. Bordwell et al. discloses a mounting assembly that includes clip-on securement members that are mountable to the outer sidewalls of an electrical box. Each securement member includes a bracket positioned on an external surface of the sidewall and a brace supported by the bracket. The brace is movable on the bracket so as to clamp the box to the mounting wall. Herth et al. discloses a modular interchangeable electrical work box. The work boxes have insert sheaths for fasteners for attaching the work box to a stud.

Although the patents to Bowden, Jr., Suk, and Bordwell et al. disclose electrical boxes for use in old work situations, they all rely on clamping type mechanisms that tighten onto the wall covering of the structure. Unfortunately, the wall covering is typically not a structurally strong portion of the wall. Sheet rock for example is used on interior walls, and is not a high strength material. So although the electrical boxes may clamp onto the wall material, the resulting electrical box is not very strongly attached.

The electrical box disclosed in Herth et al. improves the installation by providing fastener insert sheaths and fasteners. The fasteners are driven into the studs of the wall instead of into the wall covering. Although this is an improvement over the prior art boxes that employ clamping members, as a result of providing the fastener insert sheaths, the one piece box disclosed by Herth et al. loses a large portion of the internal volume of the box. Therefore, although the box provides a better connection to the wall, the resulting volume within the box is small and provides inadequate space for completing wiring connections within the box.

What is needed therefore is an electrical box that can be securely fastened to a structurally strong portion of the wall while at the same time providing adequate internal volume for completion of all wiring connections.

SUMMARY OF THE INVENTION

The invention is a two-piece electrical box including a box member having a channel formed in one sidewall. An insert can be locked into the channel to form an electrical enclosure. The insert includes an internal mounting arrangement that can be used to mount the electrical box in either new work or old work applications. The combined box member and insert with the internal mounting arrangement enables an electrical box having a significantly larger internal volume than prior art one-piece molded electrical boxes.

OBJECTS AND ADVANTAGES

A first advantage of the electrical box of the present invention is that it mounts to a structurally sound portion of a building structure, such as a framing stud, rather than clamping to the wall covering as is presently the case with prior art boxes that rely upon clamping members.

Another advantage provided by the electrical box of the present invention is that the mounting arrangement is integral with a separate insert portion of the electrical box rather than with the box itself. As a result, the fastener receptacles formed integral with the insert do not take up a great amount of usable volume within the box, as is the case with prior art boxes in which fastener receptacles are formed integral with the box. Prior art boxes are typically molded in one piece, with the fastener receptacles internal to the box. Molding a box in one piece eliminates a large amount of internal volume and makes it impossible to fit a large electrical component, such as a ground fault receptacle, within the resulting box. The two-piece electrical box of the present invention provides a large internal volume with ample space for bulky devices such as ground fault receptacles.

A further advantage of the electrical box of the present invention is that the entire internal mounting arrangement is enclosed within the confines of the internal enclosure. No portion of the mounting arrangement extends beyond the front edge of the enclosure.

Another significant advantage is that an appropriate tool can easily reach the mounting arrangement, without any interference from the sidewalls or other portions of the box. A tool, such as a screwdriver, can be aligned with the axis of the fasteners and used to drive the fasteners therein without any interfering contact with the sidewalls of the box.

These and other objects and advantages of the present invention will be better understood by reading the following description along with reference to the drawings.

DESCRIPTION OF THE DRAWINGS

FIG. 6 is a side view of the recessed electrical box taken along line 6—6 of FIG. 5.

TABLE OF NOMENCLATURE

The following is a listing of part numbers used in the drawings along with a brief description:

| Part Number | Description |
|---|---|
| 20 | electrical box with sidewall insert |
| 22 | box member |
| 24 | sidewall insert |
| 26 | sidewall |
| 26A | top sidewall |
| 26B | bottom sidewall |
| 28 | partial sidewall |
| 30 | front edge of box member |
| 32 | back wall |
| 34 | open front |
| 36 | channel |
| 38 | upper edge |
| 40 | lower edge |
| 42 | rear edge |
| 44 | fastener guide |
| 46 | aperture in fastener guide |
| 48 | latching ramp |
| 50 | outer surface of insert |
| 52 | front edge of insert |
| 54 | internal mounting arrangement |
| 56 | inner surface of insert |
| 58 | boss |
| 60 | front face of boss |
| 62 | bore |
| 64 | fastener |
| 66 | axis |
| 72 | tab receiving recess |
| 74 | recessed portion of partial sidewall |
| 76 | outer surface of partial sidewall |
| 78 | enclosure |
| 80 | blade of screwdriver |
| 82 | stud or similar structure |
| 84 | upper surface of insert |
| 86 | lower surface of insert |
| 88 | inner tab |

-continued

| Part Number | Description |
|---|---|
| 90 | outer tab |
| 92 | gap |
| 94 | stop |
| 96 | outer surface of stud |
| 97 | surface of wall covering |
| 98 | wall covering |
| 100 | electrical component contact point |
| 102 | fastener |
| 104 | electrical device |
| 106 | removable wall portion |
| 108 | first removable wall portion |
| 110 | second removable wall portion |
| 112 | open area |
| 114 | thin wall area |
| 116 | corner of box member |
| 118 | knockout |
| 118A | top knockout |
| 118B | bottom knockout |
| 120 | back side of box |
| 122 | top side of box |
| 124 | bottom side of box |
| 126 | side of stud |
| 130 | electrical cable |
| 132 | wall opening |
| θ | angle of fastener axis with respect to inner surface |
| θ$_2$ | angle of knockouts with respect to back wall |
| D | distance of boss from front edge of insert |
| T | thickness of partial sidewall of box member |

DETAILED DESCRIPTION OF THE INVENTION

Figure 1:
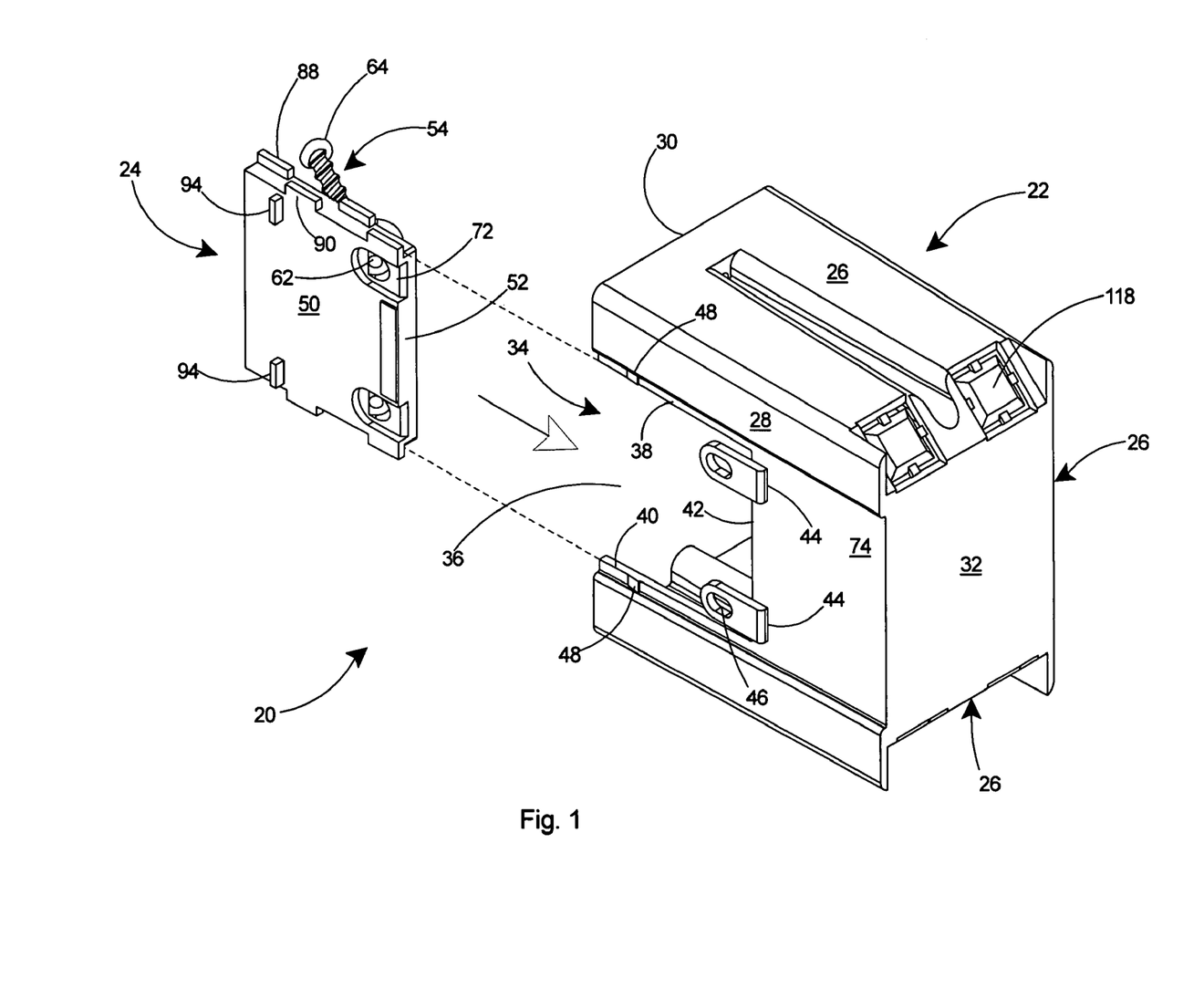
FIG. 1 is an exploded perspective view of a preferred embodiment of an electrical box according to the present invention including a box member and an insert.

With reference to a preferred embodiment in FIG. 1, the present invention is an electrical box 20 comprised of a box member 22 and a sidewall insert 24 for securing an electrical device such as a duplex outlet (not shown) or similar device in a wall. The electrical box 20 is shown in FIG. 1 with the insert 24 exploded away from the box member 22 and ready to be snapped thereto. The box member 22 includes three sidewalls 26, a partial sidewall 28 extending between two of the sidewalls 26, a substantially planar front edge 30 extending along the sidewalls 26 and the partial sidewall 28, a back wall 32, and an open front 34. The box member 22 includes an open channel 36 in the partial sidewall 28 with the open channel 36 defined by an upper edge 38, lower edge 40, and rear edge 42 on the partial sidewall 28. The box member 22 further includes at least one fastener guide 44 extending from the rear edge 42 of the partial sidewall 28. The fastener guides 44 each include an aperture 46 therein. Latching ramps 48 extend from the partial sidewall 28 at the upper edge 38 and the lower edge 40, the latching ramps 48 lock the insert 24 within the channel 36 when the insert 24 is inserted therein. The insert 24, in alignment with the channel 36 and ready to be snapped therein, includes an outer surface 50, a front edge 52 and an internal mounting arrangement 54.

Figure 10:
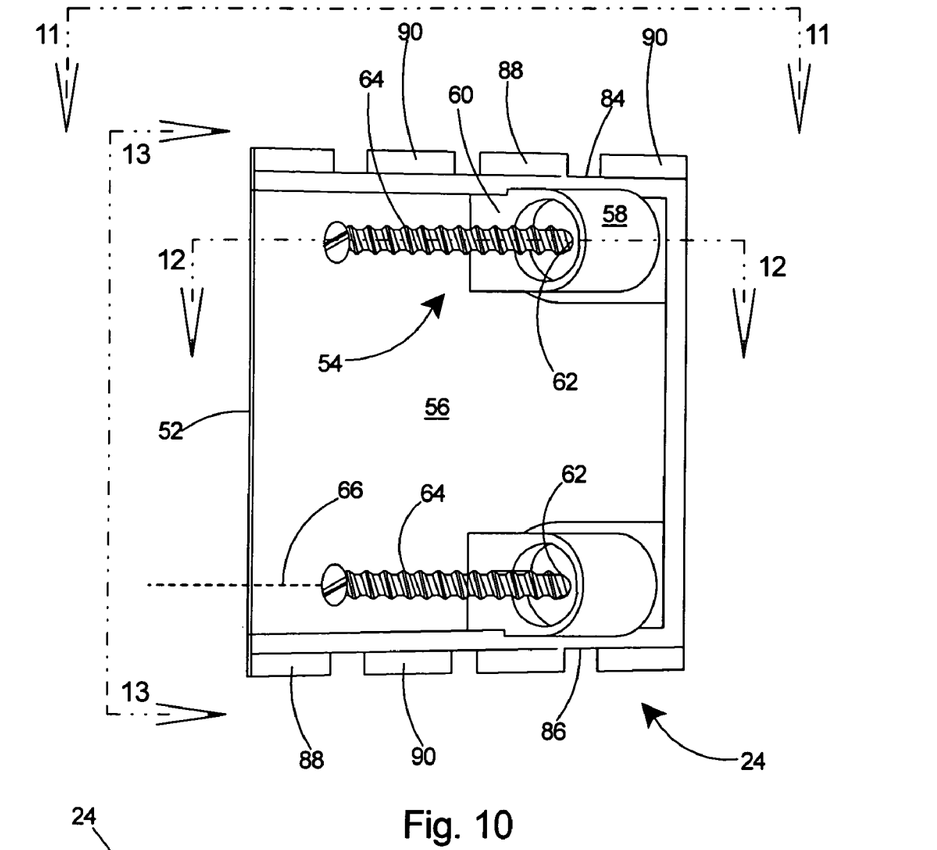
FIG. 10 is a elevation view of the insert portion shown in FIG. 1.
Figure 11:
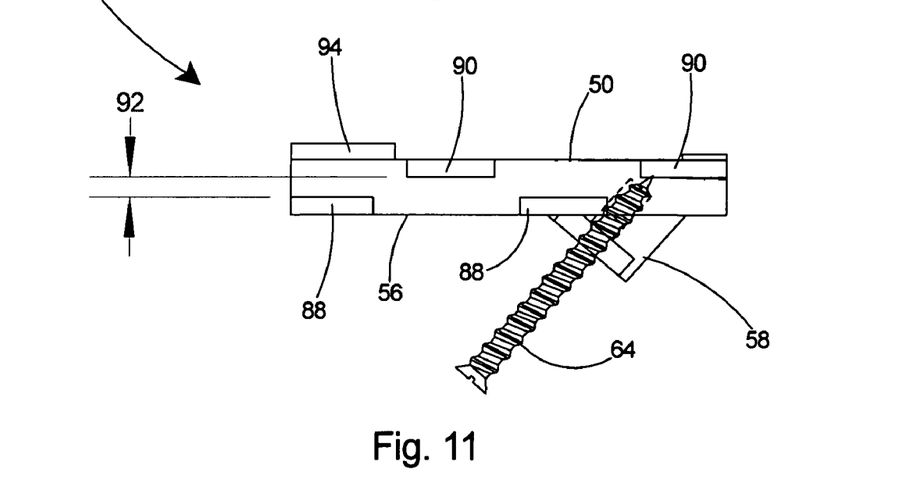
FIG. 11 is a top view of the insert taken along line 11—11 of FIG. 10.

Referring to FIG. 10, the insert 24 includes an inner surface 56 and the internal mounting arrangement 54 secured to the inner surface 56. The internal mounting arrangement 54 includes at least one boss 58 integral with and extending from the inner surface 56 of the insert 24, a front face 60 and a fastener receiving bore 62 within the boss 58, and a fastener 64 partially inserted and frictionally held within the boss 58. As shown in FIG. 11, the fastener 64 is aligned along an axis 66 concentrically through the fastener 64 and extending through the boss 58 and the fastener receiving bore 62.

Figure 2:
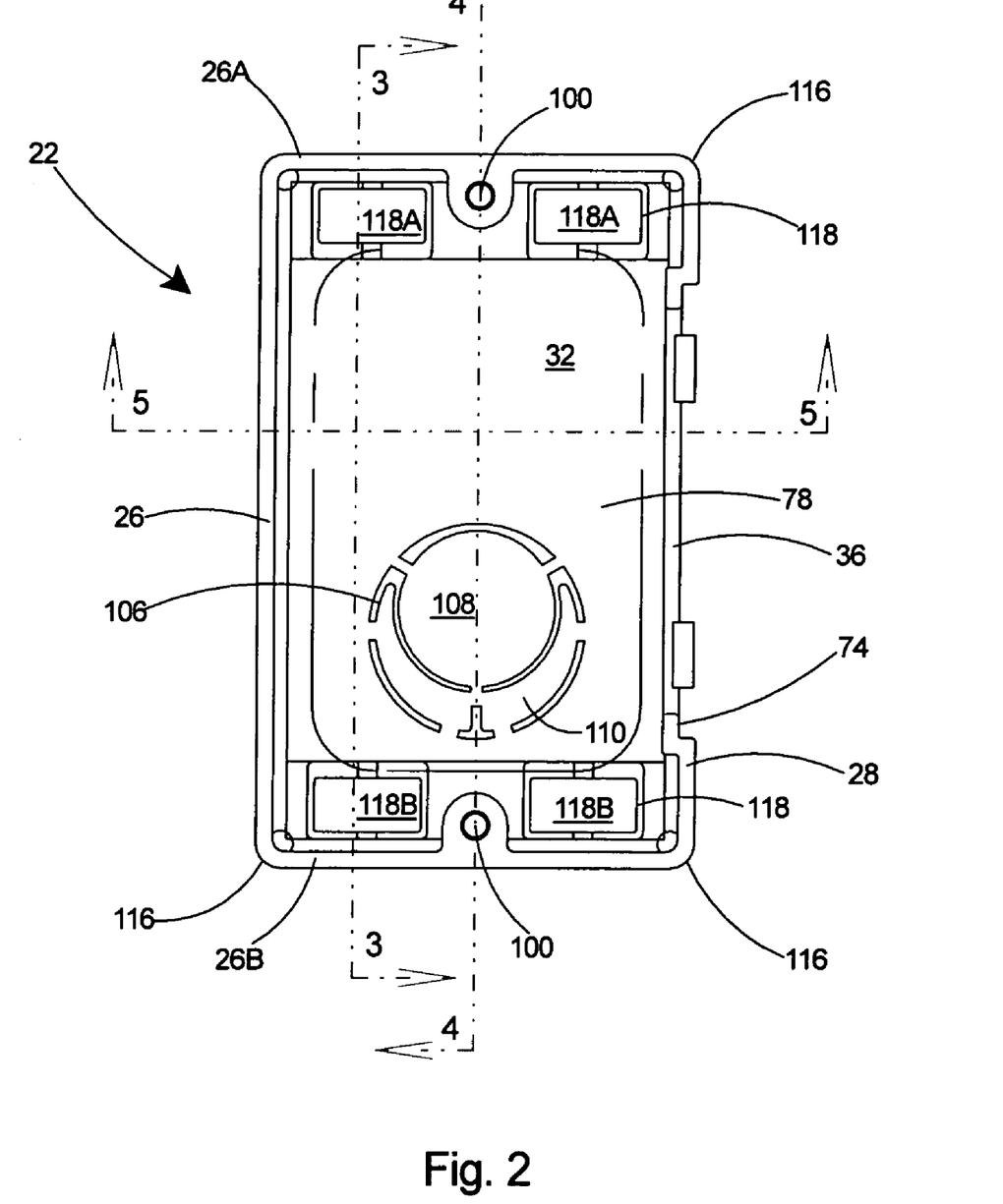
FIG. 2 is a front view of the box member portion shown in FIG. 1.

Referring to FIG. 1, the partial sidewall 28 of the box member 22 further includes at least one fastener guide 44 extending from the rear edge 42 of the partial sidewall 28 and having an aperture 70 therein. The outer surface 50 of the insert 24 includes guide receiving recesses 72. When the insert 24 is inserted fully into the channel 36, as shown in FIG. 2, the latching ramps 48 lock the insert 24 within the channel 36. With the insert 24 locked into the channel 36, the bores 62 of the internal mounting arrangement 54 are in axial alignment with the apertures 70 of the fastener guides 44. When later securing the electrical box 20 to a structure, the alignment of the bores 62 in the internal mounting arrangement 54 with the apertures 70 in the fastener guides 44 will enable the insert 24 to be further locked to the box member 22 as the fastener 64 is advanced therethrough. Furthermore, when the insert 24 is inserted into the channel 36, the guide receiving recesses 72 receive the fastener guides 44 therein.

Figure 1A:
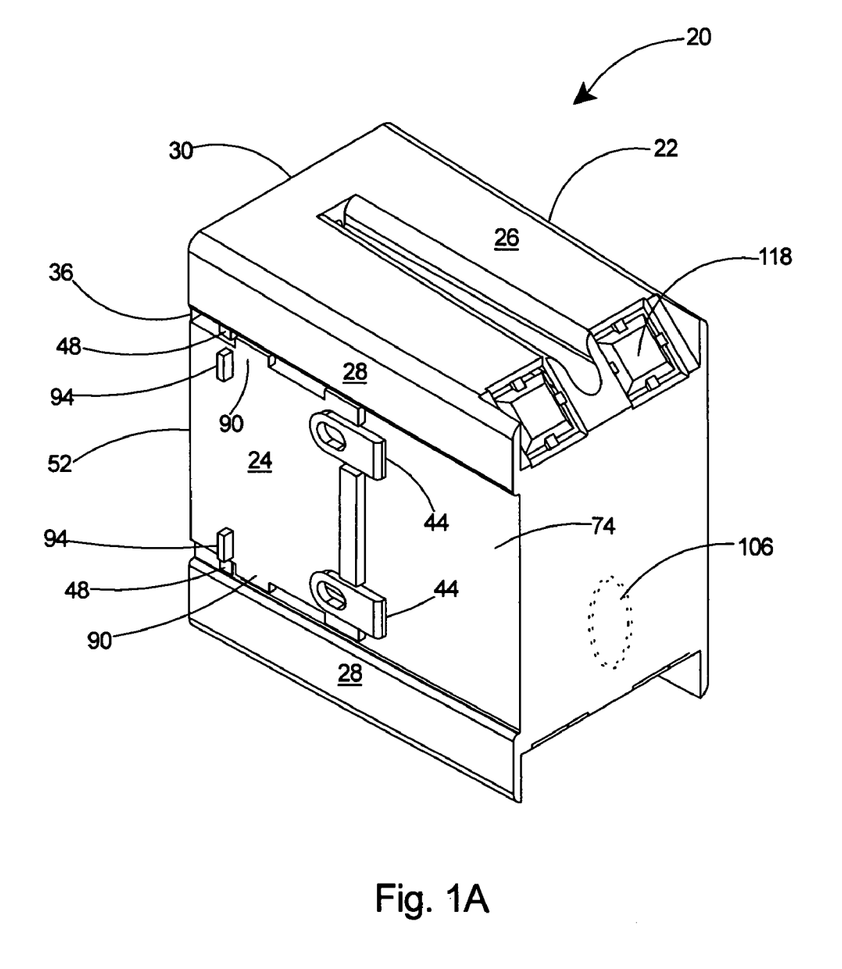

With reference to FIG. 1A, after being snapped into the channel 36 and secured to the box member 22, the insert 24 substantially closes the sidewalls 26 of the box member 22 and the front edge 52 of the insert 24 is substantially planer with the front edge 30 of the box member 22. It should be noted that the fastener guides 44 are located on a recessed portion 74 of the partial sidewall 28.

Figure 14:
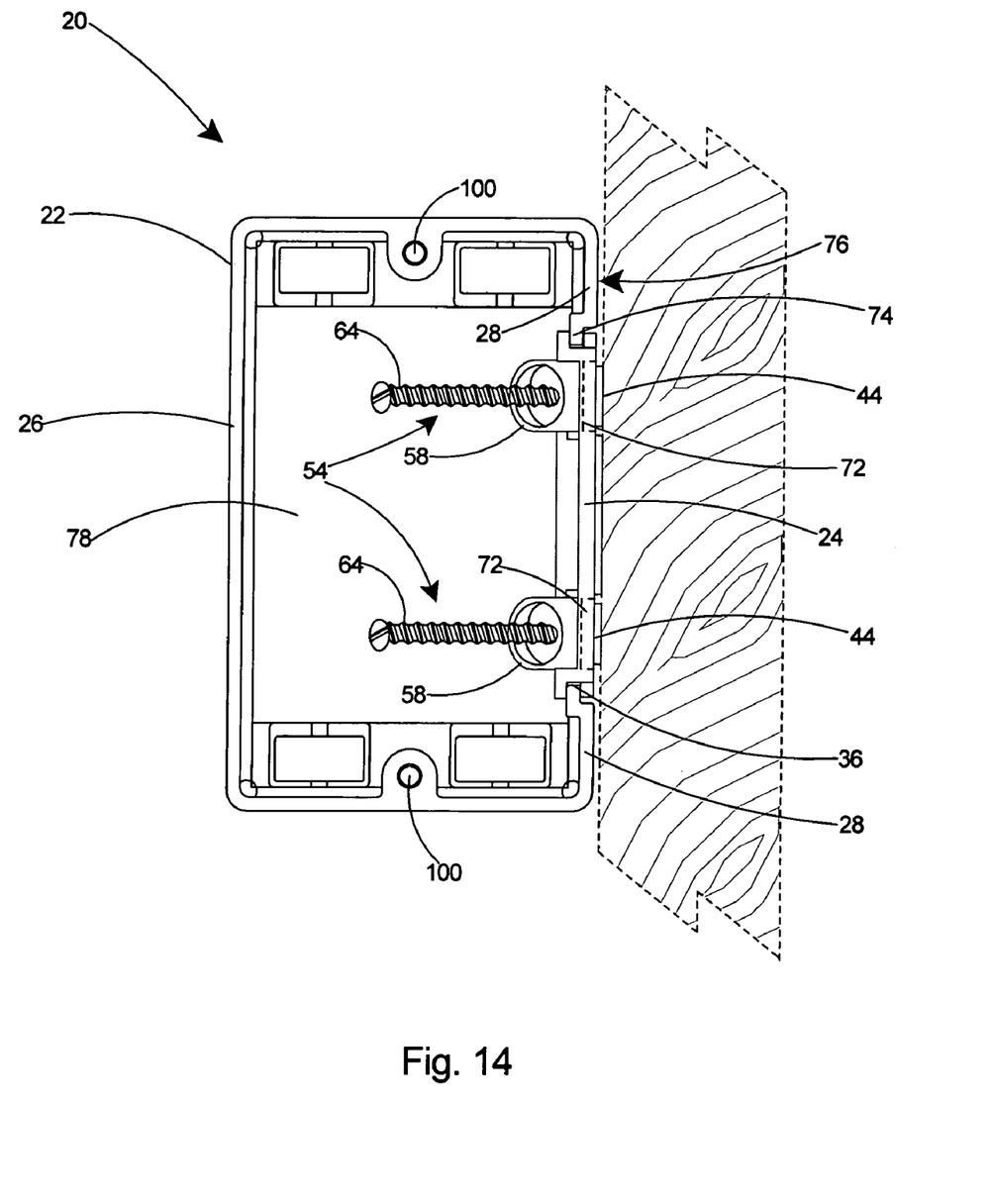
FIG. 14 is a front view of the electrical box of the present invention in position against a framing stud and ready for securing thereto.

Referring to FIG. 14, as a result of the recessed portion 74 and the fastener guides 44 having been received in the guide receiving recesses 72, the insert 24 and the fastener guides 44 are substantially flush with the outer surface 76 of the partial sidewall 28. With the insert 24 locked into the channel 36, the insert 24 substantially closes the sidewalls 26 of the box member 22 and defines an enclosure 78 therein.

Figure 12:
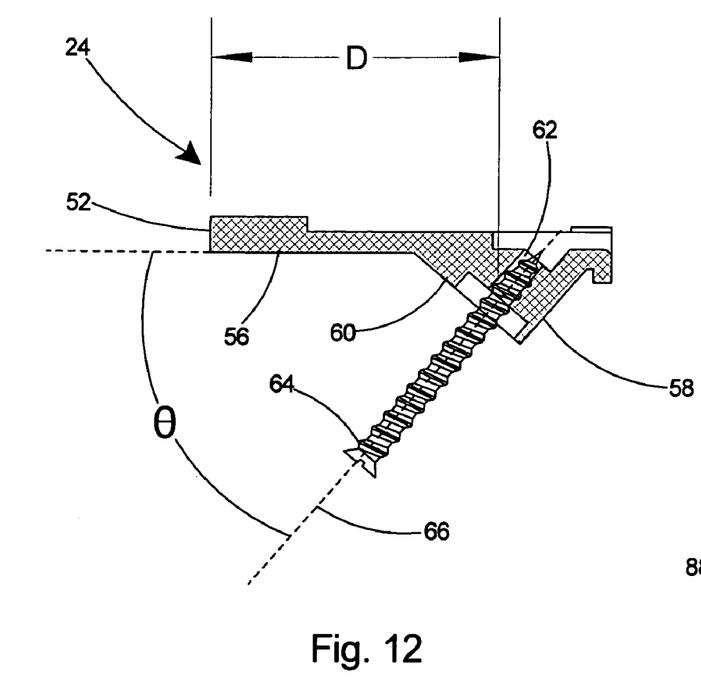
FIG. 12 is a sectional view of the insert taken along line 12—12 of FIG. 10.

As shown in FIG. 12, each boss 58 on the inner surface 56 is located a distance D from the front edge 52 of the insert 24. The front face 60 of the boss 58 is at a 90-degree angle to the axis 66 of the bore 62 and fastener 64 and at an angle θ with respect to the inner surface 56 of the insert 24.

Figure 15:
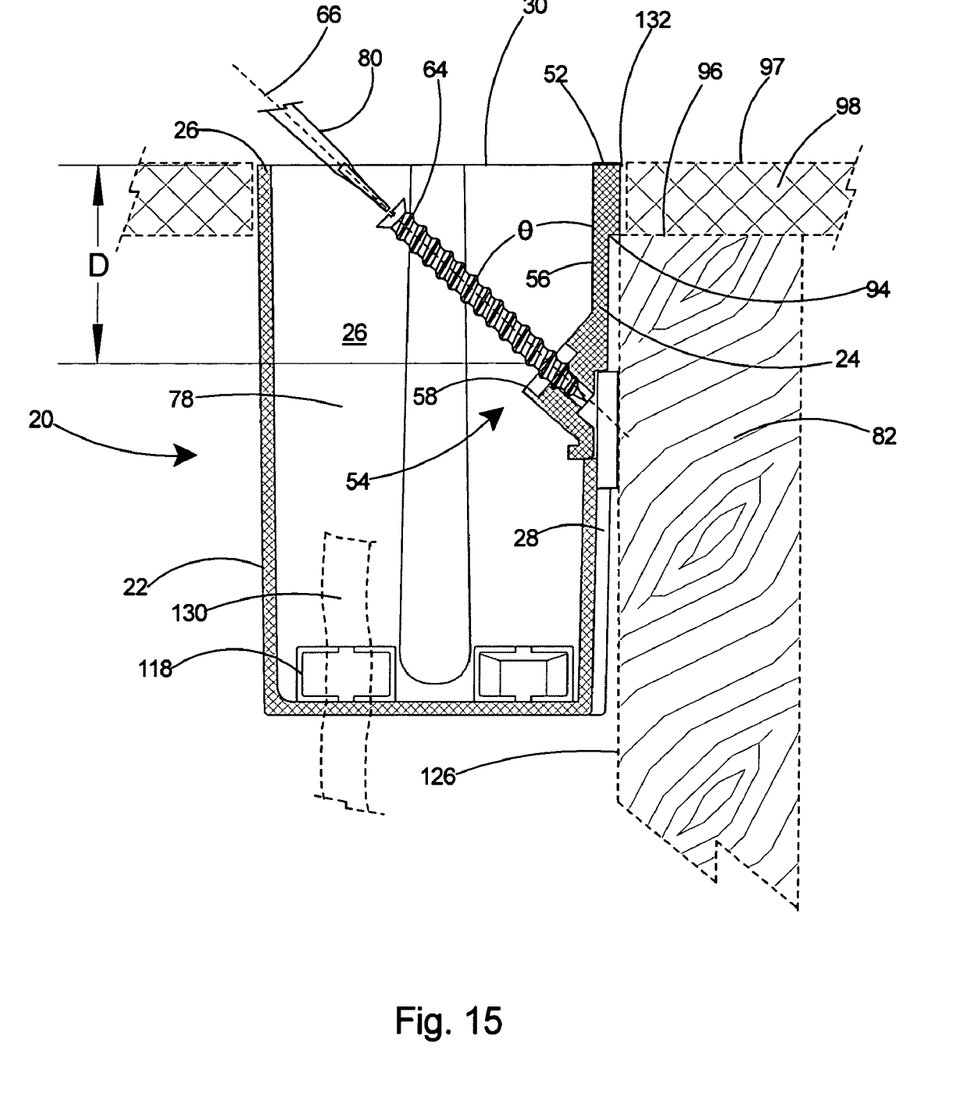
FIG. 15 is a top view of the electrical box of the present invention in position against a framing stud and ready for securing thereto.

With reference to FIG. 15, the distance D of the boss 58 from the front edge 52 and the angle θ with respect to the inner surface 56 orient the fastener 64 of the internal mounting arrangement 54 such that the axis 66 is clear of the sidewalls 26 and the front edge 30 of the box member 22. The positioning of the boss 58 with respect to the front edge 52 and the angle θ with respect to the inner surface 56 insure that the fastener 64 will be easily accessible by a tool, such as a screwdriver 80, for driving the fastener 64 into the structure 82 without any interference by the sidewalls 26 of the box 20.

With reference to FIG. 12, preferably the angle θ between the axis 66 and the inner surface 56 of the insert 24 is between 44 and 54 degrees and, more preferably, the angle θ between the axis 66 and the inner surface 56 of the insert 24 is 49 degrees.

Figure 5:
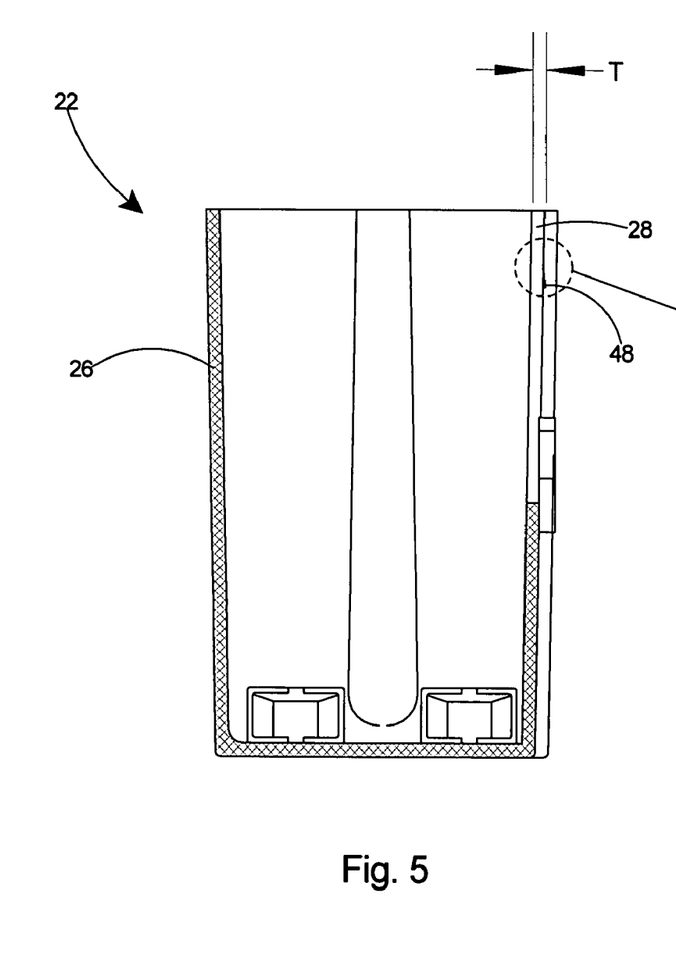
FIG. 5 is a sectional view of the box member taken along line 5—5 of FIG. 2.
Figure 6:
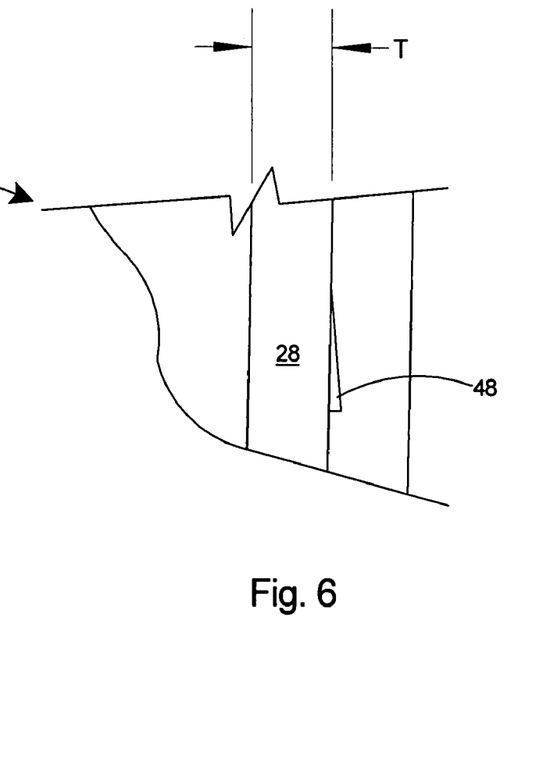
FIG. 6 is a detail view of a latching ramp portion of the box member shown in FIG. 5.

As shown in FIGS. 5 and 6, the partial sidewall 28 of the box member 22 includes a thickness T. As further shown in FIG. 10, the insert 24 includes an upper surface 84 and a lower surface 86 and inner tabs 88 and outer tabs 90 extending from the upper surface 84 and lower surface 86.

Figure 13:
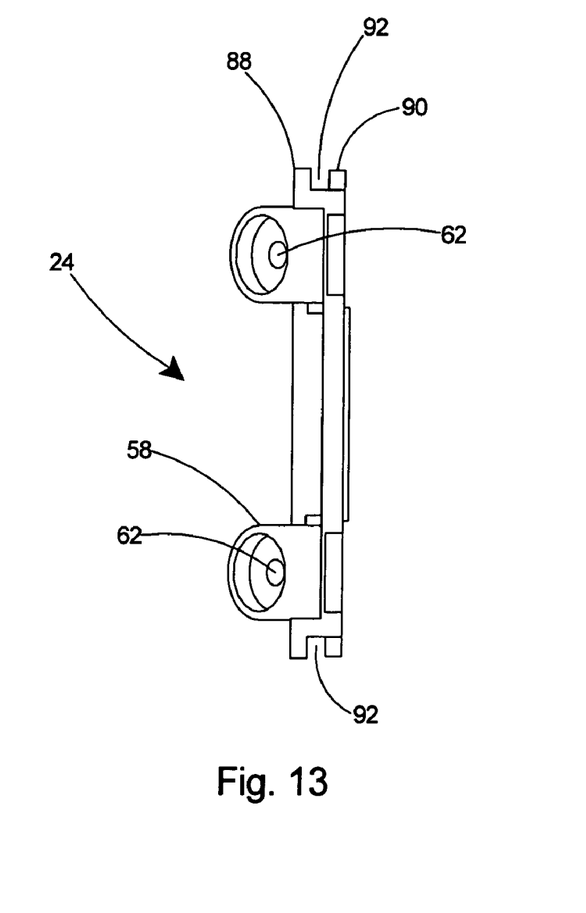
FIG. 13 is a front view of the insert taken along line 13—13 of FIG. 10.

With reference to FIGS. 11 and 13, the inner tabs 88 and outer tabs 90 of the insert 24 define a gap 92 therebetween. The gap 92 is slightly larger than the thickness T (see FIG. 5) of the partial sidewall 28 such that insertion of the insert 24 within the channel 36 enables the inner and outer tabs 88, 90 to engage the upper edge 38 and lower edge 40 of the partial sidewall 28 (see FIG. 1).

Referring to FIG. 11, the insert 24 further includes stops 94 extending from its outer surface 50. The stops 94, as shown in FIG. 15, enable rapid alignment with the outer surface 96 of a stud 82 or similar structure. The stops 94 preferably position the front edge 30 of the electrical box 20 one-half inch from the outer surface 96 of the stud 82, thereby positioning the front edge 30 of the box even with the anticipated surface 97 of a wall covering 98, such as sheetrock.

Figure 3:
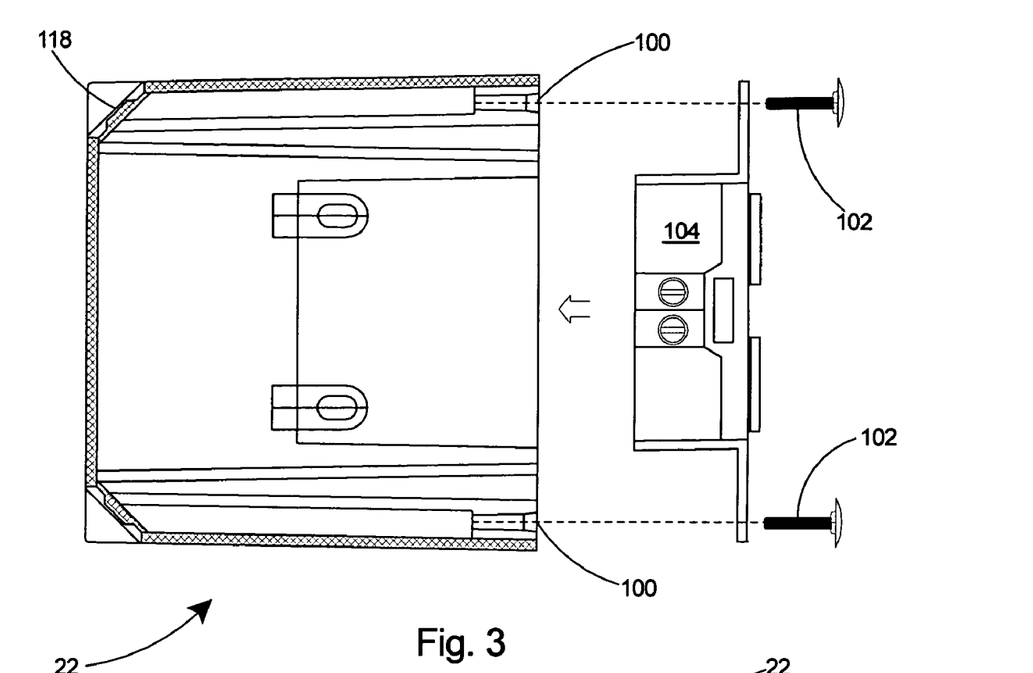
FIG. 3 is a sectional view of the box member taken along line 3—3 of FIG. 2 along with an electrical component in alignment to be secured to the box member.
Figure 4:
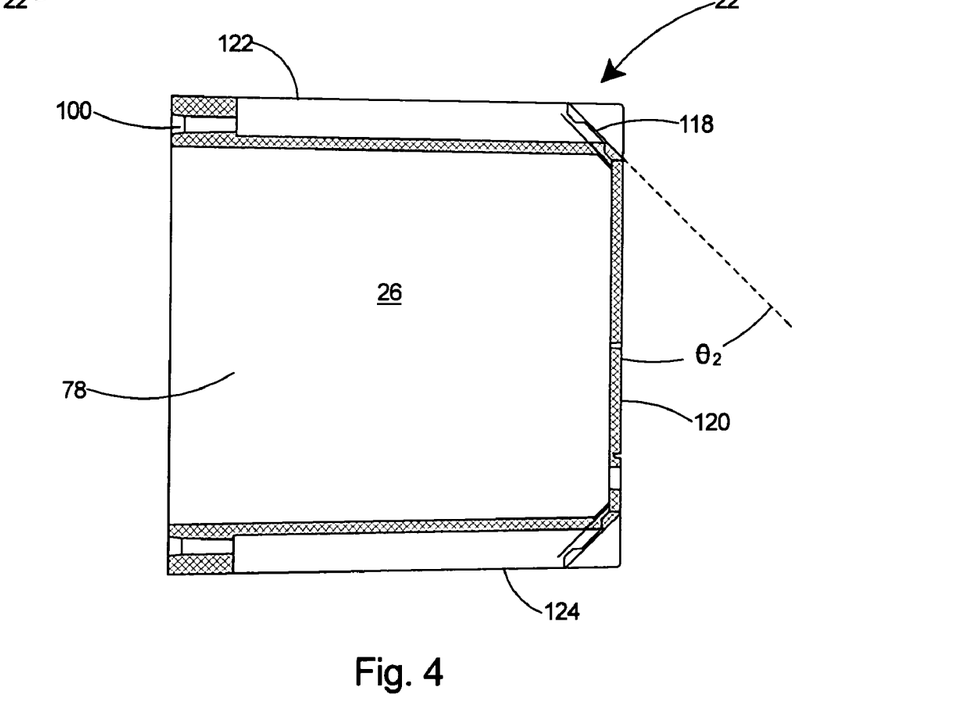
FIG. 4 is a sectional view of the box member taken along line 4—4 of FIG. 2.

With reference to FIGS. 2–4, the electrical box 20 further includes electrical component contact points 100 extending from the sidewalls 26 of the box member 22 into the enclosure 78. As shown in FIG. 3, the electrical component contact points 100 are capable of receiving fasteners 102 of an electrical device 104 therein.

Figure 7:
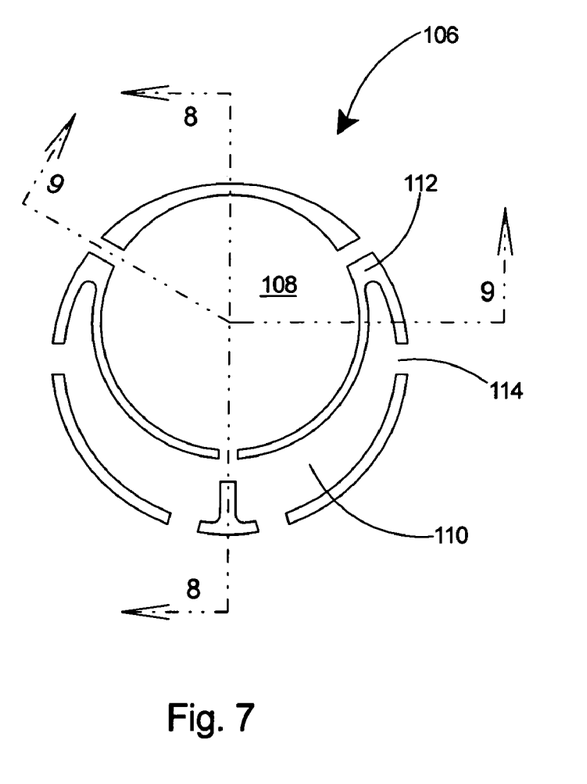
FIG. 7 is a detail view of a removable wall portion of the box member shown in FIG. 2.
Figure 8:
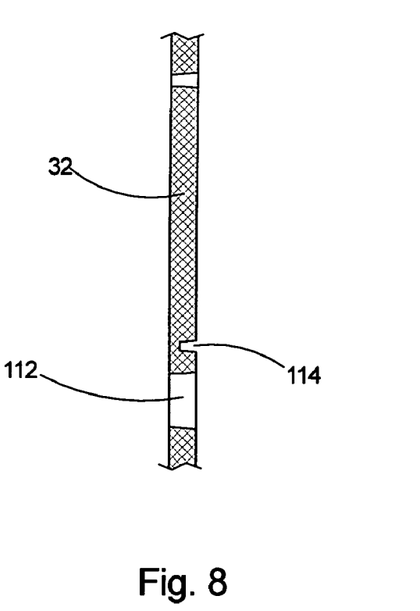
FIG. 8 is a sectional view of the removable wall portion taken along line 8—8 of FIG. 7.
Figure 9:
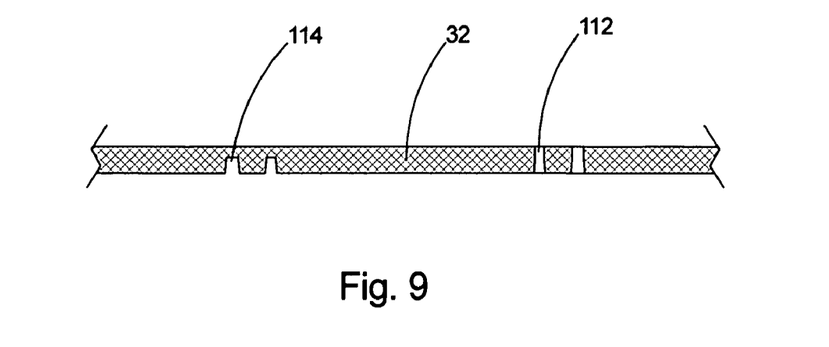
FIG. 9 is a sectional view of the removable wall portion taken along line 9—9 of FIG. 7.

As shown in FIG. 2, the electrical box 20 can further include at least one removable wall portion 106 in the back wall 32 of the box member 22. With reference to FIGS. 7–9, the removable wall portion 106 includes a first removable wall portion 108 and a second removable wall portion 110, with the first removable wall portion 108 of a smaller diameter than the second removable wall portion 110. The removable wall portion 106 includes open areas 112 and thin wall areas 114 bridging the open areas 112, so that an installer can selectively remove either the first removable wall portion 108 or second removable wall portion 110 as desired to accommodate the size of the cable or cables entering the electrical box.

As shown in FIG. 2, the back wall 32 includes four corners 116 and a knockout 118 at each of the corners 116. The sidewalls 26 of the box member further include a top sidewall 26A and a bottom sidewall 26B. The knockouts 118 at each of the corners include top knockouts 118A at the juncture of the top sidewall 26A and the back wall 32 and bottom knockouts 118B at the juncture of the bottom sidewall 26B and the back wall 32.

As shown in FIG. 3, the top knockouts 118A and bottom knockouts 118B are at an angle $\theta_2$ of 45 degrees with respect to the back wall 32. This enables easy access to the enclosure 78 by cables (not shown) approaching the electrical box 20 from either the back side 120, top side 122, or bottom side 124 of the box.

The fastener 64 of the internal mounting arrangement 54, when frictionally held within the boss 58 as shown in FIG. 15, is completely within the electrical box enclosure 78. Therefore, the fastener 64 does not extend beyond the front edge 30 that extends along the sidewalls 26 of the box member 22 and the front edge 52 of the insert 24. As a result of the entire fastener 64 being confined within the enclosure 78 of the box 20, the electrical box 20 can be easily arranged side by side within a package for shipment or on a shelf for display purposes. By being held within the internal mounting arrangement 54, the fastener 64 is included integrally with the box 20 and therefore available when needed by an installer at a job site.

As shown in FIG. 2, the partial sidewall 28 includes a recessed area 74 surrounding the channel 36. As shown in FIG. 14, when installed in the channel 36, the insert 24 is substantially flush with the outer surface 76 of the partial sidewall 28.

The electrical box 20 of the present invention is preferably supplied in one piece, as shown in FIG. 1A. The box member 22 and insert 24 are integral as a result of the latching ramps 48 locking the insert 24 into the channel 36. With reference to FIG. 14, it should be understood that box mounting fasteners 64 are integral with the box 20 and held partially within the bosses 58 of the internal mounting arrangement 54.

It should be understood that there are two basic situations in which the electrical box may be used. The first situation is termed "new work" in which the wall covering is not yet installed on the substrate. The second situation is termed "old work" in which the electrical box is used to retrofit or replace an existing electrical box in a wall having a wall covering thereon.

For an understanding of the operation of the electrical box 20 of the present invention in a new work situation, the reader is referred to FIG. 15. In a new work situation, the electrical box 20 is placed against a stud 82 with the partial sidewall 28 flush against the side 126 of the stud 82 and the stop 94 butted up against the outer surface 96 of the stud 82. The mounting fasteners 64 of the internal mounting arrangement 54 are then tightened to secure the electrical box to the stud 82. Cable 130 can then be pulled into the box 20 and a wall covering 98 secured to the front 96 of the stud 82 surrounding the box 20.

For an understanding of the operation of the electrical box 20 of the present invention in an old work situation, the reader is again referred to FIG. 15. In an old work situation, the existing electrical box (not shown) is removed from the wall leaving an opening 132 therein within the wall covering 98 adjacent the stud 82. The existing electrical cable 130 can then be pulled into the new electrical box 20 through one of the existing knockouts 118 or one of the removable wall portions (not shown). The new electrical box 20 with inserted cable 130 is then placed against the stud 82 with the partial sidewall 28 flush against the side 126 of the stud 82 and the stop 94 butted up against the front 96 of the stud 82. The mounting fasteners 64 of the internal mounting arrangement 54 are then tightened to secure the electrical box to the stud 82. The blade of the screwdriver 80, as shown in FIG. 15, has ample clearance from the sidewalls 26 of the box 20 and from the wall covering 98, which is typically flush with the front edge 30 of the box 20.

As described herein, the electrical box of the present invention provides several advantages over prior art electrical boxes. The electrical box of the present invention does not rely upon clamping members, which mount to the wall covering of a structure, but rather mounts to a structurally sound portion of a building structure, such as a framing stud.

The mounting arrangement of the present invention is integral with a separate insert portion of the electrical box rather than with the box itself thereby preventing the fastener receptacles, formed integral with the insert, from taking up a great amount of usable volume within the box. The electrical box of the present invention therefore provides significantly more volume than prior art boxes in which the fastener receptacles are formed integral with the box. The two-piece electrical box of the present invention therefore provides a large internal volume with ample space for bulky devices such as ground fault receptacles.

The electrical box of the present invention further positions the entire internal mounting arrangement within the confines of the internal enclosure, which enables more efficient packaging and storing of the box.

The placement of the internal mounting arrangement within the box of the present invention, and its geometry with respect to the inner surface, enables easy access by an appropriate tool without any interference from the sidewalls or other portions of the box. This considerably improves access to the internal mounting arrangement and enables the fasteners to be secured therein without any interfering contact with the sidewalls of the box.

With reference to FIG. 6, the latching ramp 48 extends from the partial sidewall 28 as shown. It is critical that the ramp 48 extend at least 0.05 inch from the partial sidewall 28, to insure that the latching ramp 48 properly locks the insert 24 securely into the channel 36 as shown in the perspective view of the assembled electrical box in FIG. 2.

As shown in FIG. 2, the insert 24 is fully locked into the channel 36 when the outer tab 90 clears the latching ramp 48 and snaps into position within the channel 36.

With reference to FIG. 1, the box member 22 of the present invention is preferably molded of plastic or formed of metal in one piece. The insert 24 is also preferably molded of plastic or formed of metal in one piece.

Having thus described the invention with reference to a preferred embodiment, it is to be understood that the invention is not so limited by the description herein but is defined as follows by the appended claims.

What is claimed is:

1. An electrical box comprising:
    a box member including three sidewalls, a partial sidewall extending between two of said sidewalls, a substantially planar front edge extending along said sidewalls and said partial sidewall, a back wall, and an open front;
    an open channel in said partial sidewall, said open channel defined by upper, lower, and rear edges on said partial sidewall;
    an insert secured to said box member within said channel, said insert having an inner surface and an outer surface, said insert having a front edge substantially planar with said front edge of said box member, said insert substantially closing said sidewalls of said box and defining an enclosure therein;
    an internal mounting arrangement secured to said inner surface of said insert;
    said internal mounting arrangement including at least one boss integral with and extending from said inner surface of said insert;
    said boss including a front face and a fastener receiving bore therein;
    a fastener partially inserted and frictionally held within said boss;
    said boss includes a distance from said front edge of said insert;
    said axis is at an angle with respect to said inner surface of said insert; and
    said distance of said boss and said angle of said axis positioning said fastener such that said axis is clear of said sidewalls and said front edge of said box member.

2. The electrical box of claim 1 wherein said angle of said axis with respect to said inner surface of said insert is between 44 and 54 degrees.

3. The electrical box of claim 1 wherein said front face of said boss is at an angle of 49 degrees with respect to said inner surface of said insert.

4. An electrical box comprising:
    a box member including three sidewalls, a partial sidewall extending between two of said sidewalls, a substantially planar front edge extending along said sidewalls and said partial sidewall, a back wall, and an open front;
    an open channel in said partial sidewall, said open channel defined by upper, lower, and rear edges on said partial sidewall;

an insert secured to said box member within said channel, said insert having an inner surface and an outer surface, said insert having a front edge substantially planar with said front edge of said box member, said insert substantially closing said sidewalls of said box and defining an enclosure therein;

an internal mounting arrangement secured to said inner surface of said insert;

said internal mounting arrangement including at least one boss integral with and extending from said inner surface of said insert;

said boss including a front face and a fastener receiving bore therein;

a fastener partially inserted and frictionally held within said boss;

at least one fastener guide extending from said rear edge of said partial sidewall and including an aperture therein; and said aperture of said fastener guide receiving said fastener of said insert and locking said insert to said box member when said fastener is advanced therethrough.

* * * * *